April 10, 1945. S. J. BECKER 2,373,288
LINK BELT FOR AIRPLANE CANNON
Filed Jan. 9, 1943
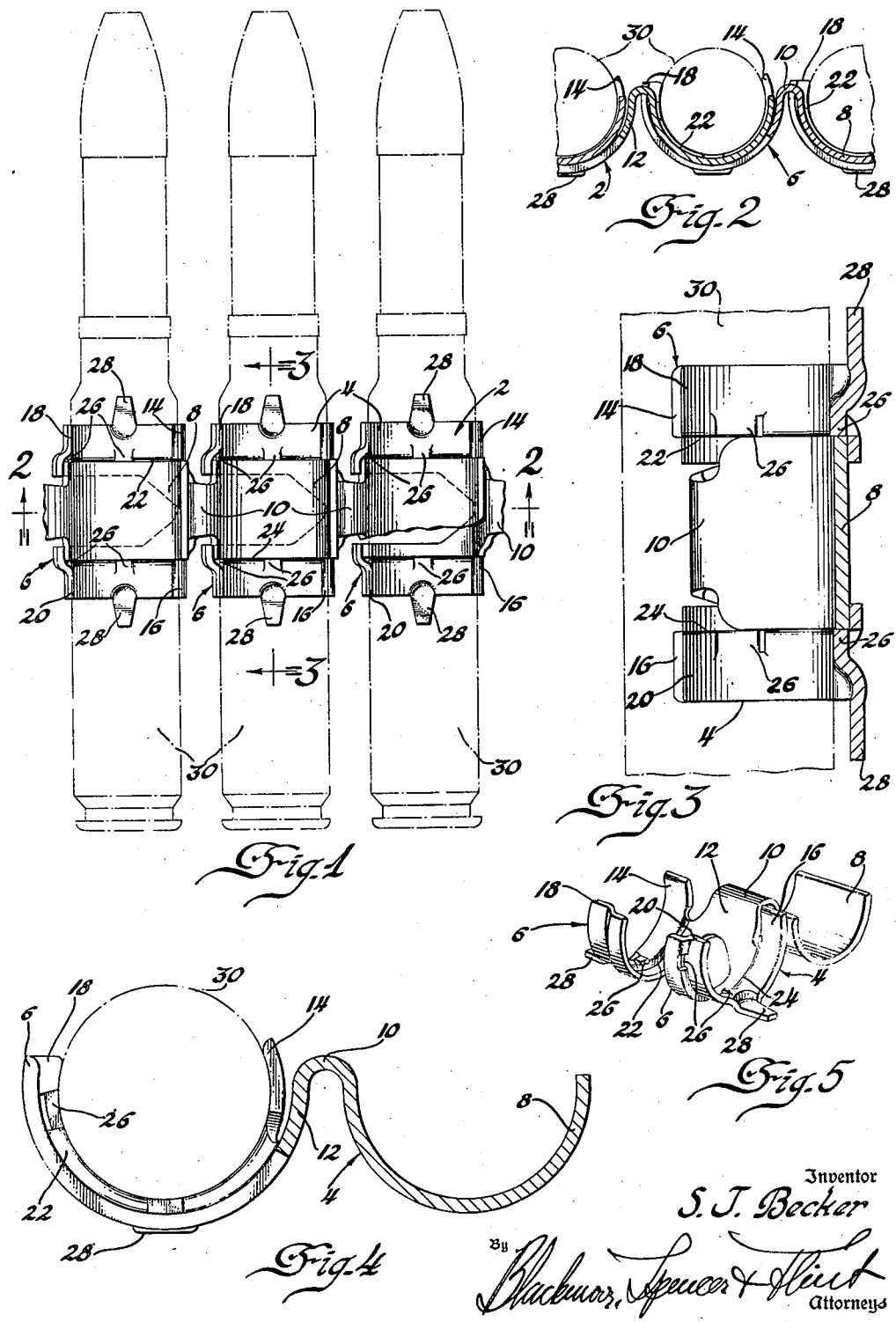

Patented Apr. 10, 1945

2,373,288

UNITED STATES PATENT OFFICE 2,373,288

LINK BELT FOR AIRPLANE CANNON

Sylvan Joseph Becker, Maywood, Ill., assignor to General Motors Corporation, Detroit, Mich., a corporation of Delaware Application January 9, 1943, Serial No. 471,849

1 Claim. (Cl. 89—35)

This invention relates to link chains used to hold and to feed cartridges to the cannon used on aircraft.

The chain comprises a plurality of duplicate links interfitting with each other to form the chain. The links are formed of stamped metal and each comprises a four-tined forked end, a tongue end, and a bight portion interconnecting the two ends. Both ends are semi-circular in shape with the tongue end adapted movably to fit in circumferentially arranged shoulders in the forked end. The forked end has prongs pressed therefrom which extend into the shoulders and against the sides of the tongue when it is in position in the shoulders. The shell of the cartridge is pressed between the tines in the forked end and retains the tongue in the circumferentially arranged groove and hold the links together to form the chain. When the shell has been removed the link can be removed from the chain.

The novel parts of the invention are: (1) the four tines on the forked end; (2) the prongs pressed into the shoulders; and (3) the bight connecting the link ends.

On the drawing:

Figure 1 is a plan view of the chain showing four interconnected links and showing the cartridges in dotted outline.

Figures 2 and 3 are sections taken on the lines 2—2 and 3—3 of Figure 1, Figure 3 being on an enlarged scale, the cartridge being shown in dotted outline.

Figure 4 is an enlarged longitudinal sectional view through one of the links with the cartridge shown in dotted outline.

Figure 5 is a perspective view of one of the links.

Referring to the drawing, the chain as a whole is indicated at 2. The chain comprises the individual separable links 4 which are duplicates of each other and which comprise a forked end 6, a prong or tongue end 8 and a bight 10. The bight 10 integrally connects the ends 6 and 8 and is comprised of a metal part 12 which is pressed or formed from the forked end 6. In forming the bight 10, two tines 14 and 16 are formed. The forked end 6 has the additional tines 18 and 20 which are positioned opposite to and cooperate with the tines 14 and 16 to hold a cartridge due to the semi-circular shape of the forked end 6. The tines 18 and 20 are formed by removing the metal at the middle of the forked end.

The prong 8 is also semi-circular in shape and fits in and conforms to the shape of the forked end of the next adjacent link. In order to enable the prong better to fit into the fork of the adjacent link, each tine 18 and 20 is provided with a semi-circular shoulder 22 and 24 on the inside of each tine. Each tine 18 and 20 is also provided with ton tongues 26, one near the end of the tine and the other at the deepest part of the semi-circle of the end 6. The tongues 26 of the tine 18 face the prongs of the tine 20 and all of the tongues extend into the shoulders 22 or 24. The tongues are formed by pressing out a part of the metal of the tines 18 and 20. The tongues are spaced apart a distance slightly greater than the width of the prong 8 to make a close fit between the prong of one link and the tines 18 and 20 of the adjacent link.

The width of the bight 10 is less than the distance between the tines 18 and 20 to enable the bight to pass between the tines so that the chain can flex at each connection.

Each tine 18 and 20 has a finger 28 projecting away from the back thereof substantially in line with one of the prongs 26. These fingers are tapered and are positioned at the deepest part of the semi-circle of the forked end 6 at the back of the tines. The fingers also project slightly beyond the back of the link as is best shown in Figure 4 so that the outer face of the fingers is offset from the cylindrical surface of the link. The purpose of these tapered projections is to prevent the links from catching on each other when the belt is pulled from the magazine. In the magazine the belt is laid back and forth upon itself.

The links are assembled by placing the prong 8 of one on the shoulders 22 and 24 of the tines of the adjacent link. The curvature of the prong 8 will conform to the curvature of the tines and of the forked end 6. As many links as desired can be used to make a chain of the desired length.

The distance from the tips of tines 14 and 16 around the circular shape of the forked end 6 to the tips of the tines 18 and 20, is a little more than 180° as can be seen in Figure 4. A cartridge 30 can be pressed or forced past the tips of the tines 14, 16, 18 and 20 to the position shown in Figures 1—4 of the drawing. Friction will hold the shells in place and the shells will hold the links together to form the chain.

After the cartridge has been removed from the chain in the cannon, the continued operation or firing of the cannon will cause the chain to move through the cannon and when a link has passed to the other side it can drop off and be re-used by applying it to the chain end at the loading side.

I claim:

In a link chain for the cartridges used on airplane cannon, said chain comprising a plurality of similarly shaped links interfitting with each other to form the chain, each link comprising a four-tined forked end, a single prong end, and an integral bight portion between the ends and interconnecting the ends, said bight portion comprising a tongue of metal bent from between the tines of the forked end, both of said ends being rounded or curved to conform to the shape of the shell of the cartridge, the prong of one link fitting between two of the tines of the forked end of the next adjacent link, said tines having a circumferential extent greater than 180° to enable them to grip and to hold the shell of the cartridge when pressed there between, said prong being held between the tines by the shell when in position, said links being held together by the shells and being readily separable when the shells are removed from the chain, the outer part of the tines being offset from the inner part to form circumferentially arranged shoulders to receive the prong of the next adjacent link, said shoulders having a plurality of small tongues pressed thereinto to engage the sides of the prong of the next adjacent link and closely to position the prong in the shoulders and between the tongues.

SYLVAN JOSEPH BECKER.